Dec. 16, 1952      W. T. SKILLMAN      2,621,463
TRIMMER AND EDGER
Filed June 28, 1949

WILLIAM T. SKILLMAN
INVENTOR.

BY Lester B. Clark
& Ray L. Smith
ATTORNEYS

Patented Dec. 16, 1952

2,621,463

UNITED STATES PATENT OFFICE 2,621,463

TRIMMER AND EDGER

William T. Skillman, Houston, Tex.

Application June 28, 1949, Serial No. 101,795

3 Claims. (Cl. 56—25.4)

The invention relates to a device which is a combination edger and mowing machine.

An object of the present invention is to provide a combination lawn edger and mower, whereby the same device can be used as an edger to trim adjacent sidewalks, driveways and the like and with a minimum of interchanging of the edger can be used as a mower to trim underneath trees, hedges, bushes, adjacent buildings, fences, flower beds, and the like.

Another object of the invention is to provide a combination lawn edger and mower including a frame with a support plate pivotally mounted therein and normally resting in substantially the same plane as the frame, but adapted to tilt at right angles to the frame, whereby a rotatable cutter blade supported on the support plane can rotate in a vertical plane to act as an edger or in a horizontal plane to act as a mower.

Still another object of the invention is to provide a combination lawn edger and mower of simple and economical construction which is provided with a roller so that the device can be used in heretofore somewhat difficultly accessible places to both mow and edge where necessary.

Still another object of the invention is to provide a combination lawn edger and mower wherein a frame is provided with a support plate tiltably mounted therein, there being a motor mounted on the support plate and a cutter blade rotatably connected to the motor so that the blade can rotate in a vertical plane to act as an edger or to rotate in a horizontal plane when the support plate is tilted relative to the frame to act as a mower, and spring means connected from the frame to the support plate to retain it in position so that the blade can rotate in the vertical plane and in position to rotate the blade in a horizontal position.

Other objects and advantages will become more apparent from a consideration of the following description and drawings wherein.

Figure 1:
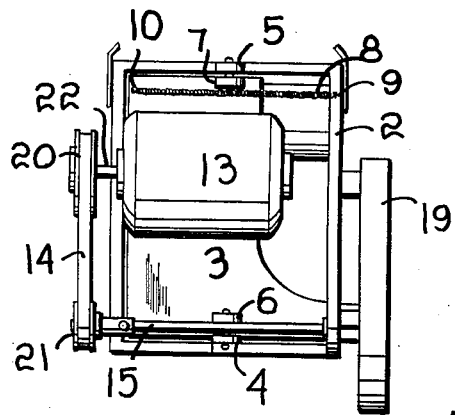
Fig. 1 is a top plan view of the device showing the support plate in its normal position cradled in the frame.

Referring first to Fig. 1, the device comprising the combination lawn edger and lawn mower is shown as comprising the frame 2 with the support plate 3 cradled or tiltably mounted therein. As illustrated, the frame 2 may take the rectangular shape as shown in the drawings and is provided with the ears 4 and 5, fore and aft, extending upwardly from the frame 2. Similarly the support plate 3 is provided with corresponding ears 6 and 7 extending upwardly therefrom whereby the plate may be pivotally connected by a pin through the ears 4 and 6, and 5 and 7 respectively. It seems obvious, of course, that any suitable means could be provided to cradle the support plate within the frame so that the plate normally rests in substantially the same plane as the frame but may be tilted at substantially a right angle relative thereto as desired.

Figure 2:
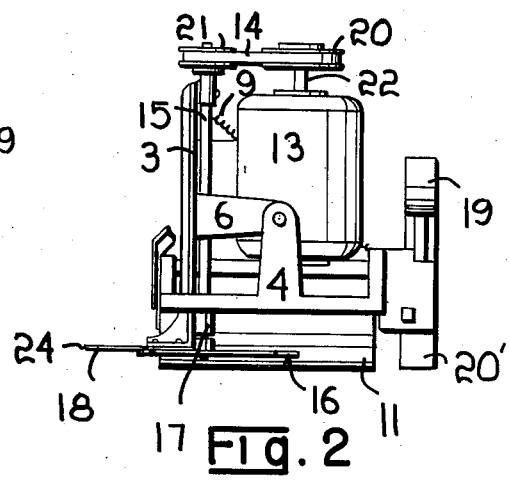
Fig. 2 is a front elevation of the combination edger and mower illustrating the position of the support plate when it is tilted at substantially a right angle with respect to the frame when the device is to be used as a mower.
Figure 3:
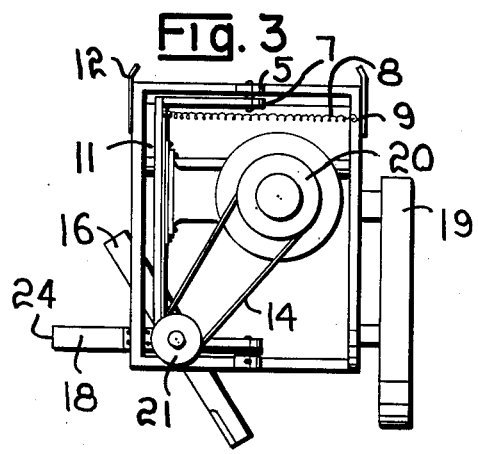
Fig. 3 is a top plan view illustrating the relative position of the component parts of the combination edger and mower when the support plate is tilted as illustrated in Fig. 2.
Figure 4:
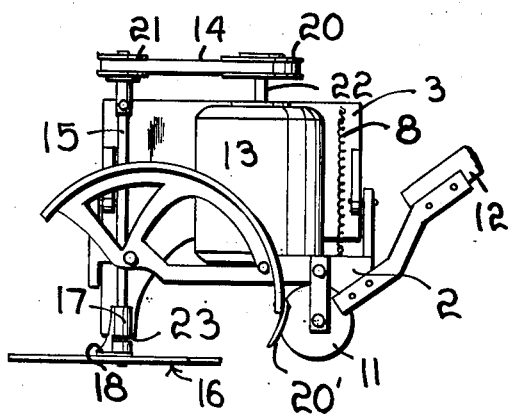
Fig. 4 is a side view of the device as it is illustrated in Figs. 2 and 3.

In order to retain the support plate 3 in its normal position within the frame 2, or to retain it in its tilted position as illustrated in Figs. 2, 3, and 4, suitable means such as the spring 8 may be provided, which spring is connected at 9 to the frame and at 10 to the support plate. Such spring serves to resiliently retain the support plate in substantially the same plane as the frame 2 when the device is to be used as an edger and it also serves to retain the support plate 3 tilted relative to the frame 2 when the device is to be used as a mower.

A roller 11 is mounted adjacent the rear end of the frame and secured thereto. A handle 12 is also secured adjacent the rear end of the frame 2 and extends upwardly therefrom so that an operator may properly guide the device during its use. A motor 13 is mounted on the support plate 3 and is connected by the belt means 14 to a rotatable shaft 15 to which a cutter blade 16 is secured. A collar 17, mounted adjacent the cutter blade 16, is provided with a stationary protector blade 18 which extends outwardly slightly beyond the arc transcribed by the cutter blade 16 during the rotation thereof. A guard 19 is mounted adjacent the frame 2 to protect the user when the blade 16 is rotating in a vertical plane to edge. If desired, a resilient material, such as rubber 20', can be secured on the guard 19 adjacent to lower end thereof as clearly illustrated in Fig. 4.

Particular attention is directed to the construction of the roller and its relation to the combination edger and mower. It has been found that a roller of this general configuration is more satisfactory than wheels so that the device can be run on places wherein the support surface is limited, such as for example, curbing or the like.

If wheels were used, it would then be necessary to have a support surface on which the device could roll which would be at least as wide as the inside distance between the wheels. However by providing a solid roller surface on which the frame is mounted, there is no limitation as to the necessary size of the support surface on which the device can be run.

It further seems obvious that while a belt is shown as providing the power connection between the motor 13 and the rotatable shaft 15, any suitable means could be adapted. Similarly, any suitable size pulleys 20 and 21 can be arranged on the shaft of the motor 22 and the rotatable shaft 15, respectively. If desired, bearings 23 may be provided in the collar 17 to reduce the friction between such collar and rotatable shaft.

Figure 5:
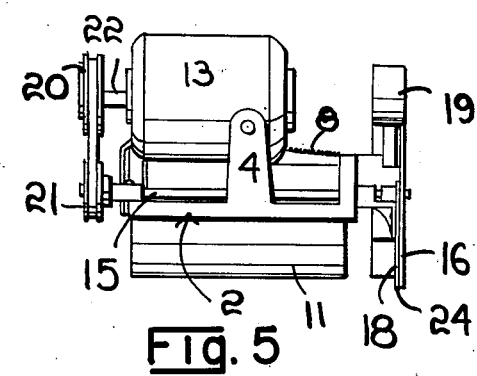
Fig. 5 is a front elevation of the device as illustrated in Fig. 1.

While it is believed that the operation of the invention is apparent by reason of the foregoing description, it will be assumed that the device is to be first used as an edger. In this situation the support plate 3 and the frame 2 will assume the normal relative position as illustrated in Figs. 1 and 5. As power is applied to the motor 13, the shaft 15 is rotated whereupon the blade 16 rotates in a vertical plane to act as an edger. The spring 8 maintains the support plates 3 and the frame 2 in the proper relation to retain the plate in its vertical position. When the device is used in this manner, the protector blades 18 will move adjacent the edge of the sidewalk, the driveway, or the like, being edged and will tend to move the grass outwardly into contact with the rotating cutter blade 16.

If it is desired to use the device as a mower to reach somewhat inaccessible places such as under trees, shrub and adjacent buildings, fences, flower beds, and the like, it is only necessary that the operator tilt the support plate to assume the position as illustrated in Figs. 2, 3, and 4.

When the support plate is tilted relative to the frame it will be substantially at a 90° angle relative to the frame. In this position, the operation of the device is similar to that as previously illustrated with the exception that the blade now rotates in a horizontal plane instead of a vertical plane. It is to be further noted that the protector blade 18, being connected to the collar 17, which is mounted on the support plate 3, also moves to a new position and acts to protect the blade 16 from engaging or contacting the surface adjacent which the device is being run. As for example, if the device is being used adjacent a house or building, to mow that narrow portion of grass or weeds which cannot be contacted by the average lawn mower, the end 24 of the protector blade 18 moves along the surface of the house and prevents the blade 16 from contacting such surface, thereby preventing undue damage to the rotating blade 16. The spring 8, as best seen in Figs. 2 and 4, assumes a position so that it tends to retain the support plate 3 in its tilted position relative to the frame 2 and prevents hunting of the support plate between such vertical position and its normal resting position within the frame 2.

A device in accordance with the instant invention has been found quite satisfactory in use and particularly advantageous in mowing under low hedges or the like which ordinarily cannot be engaged by a lawn mower of the present day type. The flexibility of the device also enables it to not only be used for a mower but also as an edger. It is simple in construction and has relatively few moving parts which wear or need replacement. Even if replacement becomes necessary the component parts of the combination edger and mower are readily accessible whereby they may be repaired or exchanged.

Broadly, the invention contemplates the combination lawn edger and mower of simple construction including a frame and a support plate adapted to be tilted relative to the frame whereby a cutter blade secured on the support plate can rotate both in a vertical and a horizontal plane to both edge and mow.

What is claimed is:

1. A lawn trimmer including a horizontal roller supported frame, a support plate pivotally mounted on said frame on a substantially horizontal pivot, a motor mounted on said plate, a rotatable shaft mounted on said plate normal to said pivot and having an end thereof on each side of said pivot, power transmission means connecting said motor and one end of said shaft, blade means mounted on the other end of said shaft and extending normally thereto, and means interconnecting said plate and said frame for maintaining said plate in a horizontal position and in a vertical position to cause said blade means to rotate in a vertical plane and in a horizontal plane.

2. A lawn trimmer including a horizontal roller supported frame, a support plate pivotally mounted on said frame on a substantially horizontal pivot, a rotatable shaft mounted on said plate normal to said pivot and having an end thereof on each side of said pivot, driving means on said plate interconnected with one end of said shaft, blade means mounted on the other end of said shaft and extending normally thereto, and means interconnecting said plate and said frame for maintaining said plate in a vertical position to cause said blade means to rotate in a horizontal plane when said plate is tilted at a right angle.

3. A lawn trimmer including a horizontal roller supported frame, a support plate pivotally mounted on said frame on a substantially horizontal pivot, a rotatable shaft mounted on said plate normal to said pivot and having an end thereof on each side of said pivot, driving means on said plate interconnected with one end of said shaft, blade means mounted on the other end of said shaft and extending normally thereto, and means interconnecting said plate and said frame for maintaining said plate in a horizontal position and in a vertical position to cause said blade means to rotate in a vertical plane and in a horizontal plane.

WILLIAM T. SKILLMAN.

REFERENCES CITED

The following references are of record in the file of this patent:

UNITED STATES PATENTS

| Number | Name | Date |
| --- | --- | --- |
| Re. 21,274 | Orr | Nov. 21, 1939 |
| 1,207,828 | Zabriskie | Dec. 12, 1916 |
| 1,346,031 | Josias | July 6, 1920 |
| 1,601,859 | Johnson | Oct. 5, 1926 |
| 1,789,398 | Aubertin | Jan. 20, 1931 |
| 2,139,353 | Bruder | Dec. 6, 1938 |
| 2,200,799 | Miller | May 14, 1940 |
| 2,291,999 | Wilson | Aug. 4, 1942 |
| 2,365,408 | Hillyer | Dec. 19, 1944 |
| 2,404,504 | Klose | July 23, 1946 |
| 2,410,196 | Benthall | Oct. 29, 1946 |
| 2,461,188 | Stoner | Feb. 8, 1949 |
| 2,480,922 | Harshman | Sept. 6, 1949 |